United States Patent [19]

Park

[11] 4,331,779
[45] * May 25, 1982

[54] ETHYLENIC POLYMER FOAMS HAVING IMPROVED DIMENSIONAL STABILITY

[75] Inventor: Chung P. Park, Pickerington, Ohio

[73] Assignee: The Dow Chemical Co., Midland, Mich.

[*] Notice: The portion of the term of this patent subsequent to Jul. 29, 1997, has been disclaimed.

[21] Appl. No.: 165,991

[22] Filed: Jul. 7, 1980

Related U.S. Application Data

[63] Continuation-in-part of Ser. No. 14,019, Feb. 22, 1979, Pat. No. 4,215,202.

[51] Int. Cl.$^3$ ............................................... C08L 23/06
[52] U.S. Cl. ..................................... 521/134; 264/53; 264/DIG. 5; 521/81; 521/98; 521/910; 525/221
[58] Field of Search ................... 525/221; 521/134, 81

[56] References Cited

U.S. PATENT DOCUMENTS

| | | | |
|---|---|---|---|
| 3,248,359 | 4/1966 | Maloney | 525/221 |
| 3,437,718 | 4/1969 | Rees | 525/196 |
| 3,696,059 | 10/1972 | Hosoda et al. | 521/81 |
| 3,711,430 | 1/1973 | Rubens | 521/94 |
| 4,102,829 | 7/1978 | Watanahi et al. | 521/134 |
| 4,203,815 | 5/1980 | Noda et al. | 521/81 |
| 4,215,202 | 7/1980 | Park | 521/81 |

*Primary Examiner*—Morton Foelak

[57] ABSTRACT

The dimensional stability of relatively unstable substantially closed-cell low density foams of non-ionic ethylenic polymers (e.g., polyethylene, ethylene/vinyl acetate copolymers, etc.) can be notably improved by the incorporation therein (during the preparation thereof) of from about 5 to about 95 weight percent (based on total polymer weight) of a copolymer of ethylene with from about 3 to about 45 weight percent of a monoethylenically unsaturated carboxylic acid.

15 Claims, No Drawings

ETHYLENIC POLYMER FOAMS HAVING IMPROVED DIMENSIONAL STABILITY

CROSS-REFERENCE TO RELATED APPLICATION

This application is a continuation-in-part of application Ser. No. 14,019, filed Feb. 22, 1979, now U.S. Pat. No. 4,215,202, issued July 29, 1980.

BACKGROUND OF THE INVENTION

This invention relates in one aspect to low density, closed-cell foams which are made from blends of non-ionic ethylenic polymers and substantially non-neutralized carboxylated copolymers of ethylene with a monoethylenically unsaturated carboxylic acid. In another aspect, this invention pertains to an improvement whereby dimensionally stable low density, closed-cell ethylenic polymer foams can be obtained using blowing agents which otherwise do not produce foams having satisfactory dimensional stability. In yet another aspect, this invention relates to dimensionally stable soft ethylenic polymer foams made from blends comprising non-ionic copolymers of ethylene having relatively low modulus (i.e., materials lacking stiffness and which are limp, flexible and easily stretched).

The term "stiffness" as used herein means the property of plastics as determined by the test procedure described in ASTM D-747, expressed in pounds per square inch (psi).

It is well known to make closed-cell ethylenic polymer resin foams by the process of extrusion foaming wherein a normally solid thermoplastic ethylenic polymer resin such as polyethylene is heat-plastified and mixed under pressure with a volatile material such as 1,2-dichlorotetrafluoroethane to form a flowable gel which is then passed through a shaping orifice or die opening into a zone of lower pressure. Upon the release of pressure, the volatile constituent of the gel vaporizes, forming a gas phase cellular structure which cools to a corresponding cellular foamed solid resin. Desirably, the resulting cells are substantially uniform in size, uniformly distributed through the foam body, and closed, i.e., separated from each other by membrane walls of resin. Although a number of general principles are thought to be understood, much of the extrusion foaming technology remains empirical, based on experience, and is directed to very specific materials and details to produce saleable products of narrowly defined specification.

One of the common requirements of acceptable foam resin products is dimensional stability. That is, in such products, it is generally desired that the linear dimensions and thus the volume of a piece of foam resin not change appreciably, either to shrink or to expand, under ordinary conditions, from the time its manufacture is complete until the time its ultimate useful life is ended. It is also desired that if any appreciable shrinking of the foam is to occur, which is often the case with a freshly extruded foam, the foam be able to recover within a reasonable period of time to a substantially constant volume close to that of the foam measured shortly after its extrusion. The difficulties of attaining dimensional stability are particularly acute in foams of relatively low density (high expansion ratio) when the resin membrane cell walls are relatively thin. It has been explained that the vapors of volatile material originally present in the cell gradually permeate the cell wall and escape from the foam over a period of time, thereby tending to reduce the inner cell pressure and tending to cause the foam to shrink during that time. However, when the foam is exposed to ambient atmosphere, air and its constituent gases also tend to permeate into the foam through the cell wall over a period of time thereby tending to increase the inner cell pressure. Accordingly, the actual change in cell gas pressure and size is the result of complex and often opposite forces, and the resultant effect on resin foam dimensions is difficult to predict.

Although many volatile hydrocarbons, chlorohydrocarbons, fluorocarbons, and chlorofluorocarbons, as well as volatile ethers, ketones and other materials have been suggested for making extrusion foamed resin products, most are unsatisfactory in one or more respects when used individually. It has been suggested to use mixtures of two or more of such agents, or mixtures thereof with materials not useable alone, in attempt to achieve a favorable balance of the various properties of interest in a given instance. In U.S. Pat. No. 3,766,099, for example, polyethylene is foamed by extrusion of a flowable gel containing a mixture of (A) dichlorodifluoromethane and (B) at least one of monochloropentafluoroethane and octafluorocyclobutane in certain proportions of (B) to (A) and optionally (C) one or more of certain aliphatic hydrocarbons or chlorofluorohydrocarbons. Under certain conditions, the gel is said to produce relatively stable foam products from polyethylene, whereas dichlorodifluoromethane alone produced foams showing considerable shrinkage on storage in air after production. However, the idea of using mixtures of volatile materials as blowing agents introduces even more complexity into the consideration of foaming behavior and makes prediction of results even more difficult.

These difficulties are even greater where, in place of polyethylene, there is used an ethylenic polymer resin having less stiffness, i.e., lower flexural modulus, than that of polyethylene such as, for example, copolymers of ethylene and vinyl acetate (EVA) having stiffness (ASTM D-747) less than 20,000 psi. When such soft copolymers are used, the resulting foam is very sensitive to imbalances of rates of diffusion of the residual blowing agent out of the resin and out of the cells and air into such cells so that the tendency for dimensional instability, e.g., shrinking or expanding, is even greater than for stiffer resins and foams. For example, although U.S. Pat. No. 3,766,099 alleges that its process and mixed blowing agents can be used for foaming EVA resins in place of polyethylene, the fact is that, when the system preferred for use with polyethylene is used with a soft, low-stiffness EVA resin to make a low density foam, the resulting foam is dimensionally unstable and shrinks excessively on exposure to air, and there is no direction or instruction in the patent to correct the situation and to provide a satisfactory product.

In U.S. Pat. No. 4,101,467 low density closed-cell, soft foam products having dimensional stability are made from ethylenic resins having low stiffness, especially from copolymers consisting essentially of ethylene and monoethylenically unsaturated non-ionic comonomers by the process of extrusion foaming. The process is particularly characterized in that the volatile blowing agent is composed of at least two essential constituents having certain physical characteristics. Exemplary mixtures contain (I) 1,2-dichloro-1,1,2,2-tetrafluoroethane and (II) from 25 to 50 percent chloropentafluoroethane, octafluoropropane or octafluorocyclobutane based on the mixtures of (I) and (II). In U.S. Pat. No. 4,129,530, similar soft foam products are made using an exemplary mixture containing (I) dichlorodifluoromethane and (II) from 35 to 50 percent chloropentafluoroethane, octafluoropropane or octafluorocyclobutane based on the mixtures of (I) and (II). However, using mixtures of volatile materials as blowing agents introduces more complexity into the extrusion foaming process with related process difficulties. Furthermore, there is need and desire for improved and/or alternate processes which are less difficult to carry out. It is also desirable to have such soft foam products having improved physical properties, especially for use in constructing items of wearing apparel, particularly for cushioning in sports equipment and athletic padding and for flotation in vests for water skiers, boating safety jackets and the like.

U.S. Pat. No. 4,102,829 discloses a thermoplastic foam characterized by low density, high thermal resistance, good adhesion properties and uniform cell size which comprises a mixture containing from 35 percent to 95 percent ionomer characterized by the presence of a monomer unit based on an unsaturated carboxylic acid and 5 percent to 65 percent polyolefin polymer or copolymer, based on the total weight of resin; the ethylene monomer unit and unsaturated carboxylic acid ester monomer unit values of the ionomer being from 50 to 97 mol percent and up to 30 mol percent, respectively, the neutrality value of the ionomer being up to 50 percent, the saponification value of the ionomer being at least 50 percent, and the melt index of the ionomer being from 0.1 to 50 g/10 min.; the melt index of the polyolefin being from 0.1 to 30 g/10 min. However, such patent does not contemplate low density, closed-cell, soft foam products being dimensionally stable from a polymer blend comprising a substantially non-neutralized copolymer of ethylene and carboxylic acid and a non-ionic ethylenic polymer.

U.S. Pat. No. 4,110,269 discloses a method of producing a low density polyethylene foam comprising charging an extruder with a polyethylene resin, from about 5 percent to 30 percent by weight of an ionomer resin selected from the group consisting of ionically cross-linked copolymers of ethylene/methacrylic acid and ethylene/vinyl acetate, and a nucleating agent, heating said charge so as to melt said resins, injecting an expanding agent mixture consisting of dichlorodifluoromethane and dichlorotetrafluoroethane into said melt charge in an amount of 8 percent or less by weight, said mixture comprises approximately a 2:1 ratio of dichlorotetrafluoroethane to dichlorodifluoromethane, and extruding said melt charge to form said foam. This reference also does not contemplate the use of substantially non-neutralized carboxylated ethylenic polymers as is required in the practice of the present invention.

An object of this invention is to provide dimensionally stable, low density foams of ethylenic polymer resins. Another object is to provide a method and a means for improving the dimensional stability of ethylenic polymer foams which otherwise have relatively poor dimensional stability. A particular object is to provide such improved method and a means for making soft, flexible, substantially closed-cell, low density polymer resin blend foams from ethylenic polymer resins which have low stiffness. Other objects and advantages of the invention are brought out in the description that follows.

SUMMARY OF THE INVENTION

The objects of this invention are attained in one aspect in ethylenic polymer resin blend foams having substantially closed-cell structure, dimensional stability, and low density and in an improved method and a means for making the same from ethylenic polymer resin blends using gel-foaming technology. The ethylenic polymer resin blend comprises (a) from about 5 to about 95 percent by weight of a substantially non-neutralized copolymer of ethylene with from about 3 to about 45 percent by weight of an ethylenically unsaturated carboxylic acid monomer in admixture with (b) from about 5 to about 95 percent by weight of a non-ionic ethylenic polymer.

In another aspect, the present invention resides in a method of improving the dimensional stability of an otherwise relatively dimensionally unstable, low density, closed-cell non-ionic ethylenic polymer foam, said method comprising admixing with said non-ionic ethylenic polymer during the preparation of said foam from about 5 to about 95 weight percent based upon the total weight of the polymer mixture of a substantially non-neutralized copolymer of ethylene with from about 3 to about 45 weight percent, based upon the weight of said copolymer, of a monoethylenically unsaturated carboxylic acid monomer. Such method is especially beneficial in that it facilitates the preparation of dimensionally stable, low density foams of non-ionic ethylenic polymers using volatile blowing agents which otherwise do not produce foams of such non-ionic polymers having satisfactory dimensional stability.

DETAILED DESCRIPTION OF THE INVENTION

As is disclosed in my application Ser. No. 14,019 (filed Feb. 22, 1979), dimensionally stable soft ethylenic polymer blend foams can be suitably obtained from blends of (a) from about 10 to about 60 weight percent (based on the blend) of a copolymer of ethylene with a non-ionic monomer (e.g., ethylene/vinyl acetate copolymer) with (b) from about 40 to about 90 weight percent (based on the blend) of a substantially non-neutralized copolymer of ethylene with from about 3 to about 15 weight percent (based upon said non-neutralized copolymer) of an ethylenically unsaturated carboxylic acid monomer. In addition, I have also now found that certain beneficial dimensional stability improvements can also be suitably attained when polyethylene is employed as the non-ionic polymer in place of the indicated soft copolymer of ethylene with a non-ionic monomer. Further, I have additionally discovered that when the non-neutralized ethylene/carboxylic acid copolymer comprises higher acid monomer content than earlier stated (such as, for example, from about 15 to about 45 weight percent based upon such carboxylic acid copolymer), the above-noted beneficial dimensional stability results can be suitably attained at substantially reduced levels of the non-neutralized carboxyl-containing copolymer in the indicated polymer blends; such as, for example, at levels in the range of from about 5 to about 40 weight percent based upon the weight of such polymer blends. Finally, I have further found that, even when the relatively low acid content copolymers (e.g., 3 to about 15 weight percent carboxylic acid comonomer) are employed at a level of less than about 40 weight percent in the indicated polymer blends, notably improved dimensional stability can also be thereby attained.

Thus, in view of the foregoing, it is now understood that non-ionic ethylenic polymers suitably employed in the practice of the present invention include homopolymers of ethylene (e.g., low, medium or high density polyethylenes), various copolymers of ethylene with non-ionic comonomers without regard to any particular stiffness requirement therefor as well as the relatively low stiffness non-ionic ethylenic copolymers which are described in my above-noted copending application Ser. No. 14,019 (and which description is hereby incorporated by reference). Additionally, it is also now understood that such non-ionic ethylenic polymers can suitably be employed in the practice of the present invention over a broader range of contents in the subject polymer blends (i.e., over a range of from about 5 to about 95 weight percent of the total polymer blend). However, in this latter regard it should be noted that when the non-neutralized carboxylic acid-containing copolymer is of a relatively low carboxylic acid content (e.g., containing from about 3 to about 15 weight percent of the carboxylic monomer units based upon such copolymer), such carboxylic acid-containing copolymer preferably either (a) constitutes from about 40 to about 95 weight percent of the polymer blend employed or (b) is employed in conjunction with from about 0.1 to about 10 (preferably from about 0.2 to about 5, and especially from about 0.2 to about 2) weight percent based on the polymer blend of one or more auxiliary stability control agents (e.g., stearamide) such as are taught in U.S. application Ser. No. 952,865 (filed Oct. 19, 1978, now Pat. No. 4,214,054) by S. Watanabe and Y. Matsuki, the disclosure of which is hereby incorporated by reference. On the other hand, when the non-neutralized carboxylic acid-containing copolymer employed has relatively high carboxylic acid content (e.g., containing from about 15 to about 45 weight percent of carboxylic acid monomer units based upon such copolymer), such carboxylic acid-containing copolymer preferably constitutes from about 5 to about 40 weight percent of the polymer blend employed and the non-ionic ethylenic polymer is preferably employed in those instances in an amount of from about 60 to about 95 weight percent of such polymer blend.

Typical carboxylic acid-containing ethylenic copolymers for use in accordance with this invention are normally solid thermoplastic copolymers of ethylene with comonomers having reactive carboxylic acid groups, particularly copolymers of a major proportion of ethylene and a minor proportion, typically from about 3 to about 45, preferably from 5 to 35, percent by weight, of an ethylenically unsaturated carboxylic acid. Specific examples of such suitable ethylenically unsaturated carboxylic acids (which term includes mono- and polybasic acids, acid anhydrides, and partial esters of polybasic acids) are acrylic acid, methacrylic acid, crotonic acid, furamic acid, maleic acid, itaconic acid, maleic anhydride, monomethyl maleate, monoethyl maleate, monomethyl fumarate, monoethyl fumarate, tripropylene glycol monomethyl ether acid maleate, or ethylene glycol monophenyl ether acid maleate. The carboxylic acid monomer is preferably selected from $\alpha,\beta$-ethylenically unsaturated mono- and polycarboxylic acids and acid anhydrides having from 3 to 8 carbon atoms per molecule and partial esters of such polycarboxylic acid wherein the acid moiety has at least one carboxylic acid group and the alcohol moiety has from 1 to 20 carbon atoms. The copolymer may consist essentially of ethylene and one or more of such ethylenically unsaturated acid comonomers or can also contain small amounts of other monomers copolymerizable with ethylene. Thus, the copolymer can contain other copolymerizable monomers including an ester of acrylic acid. The comonomers can be combined in the copolymer in any way, e.g., as random copolymers, as block or sequential copolymers, or as graft copolymers. Materials of these kinds and methods of making them are readily known in the art.

In the practice of the present invention, the foregoing carboxylic acid-containing copolymers are employed in "substantially non-neutralized" form and as employed herein such term means that substantially none of the carboxyl groups of such polymer are present in salt form and such term thereby excludes that class of neutralized ionic polymers commonly referred to in the art as "ionomers".

The ethylenic polymer foams of the present invention can be conveniently prepared pursuant to generally conventional extrusion foaming techniques by heat plastifying the above-described polymer blend and admixing said heat plastified blend under elevated temperature and pressure with a suitable blowing agent to form a flowable gel which is then passed through a shaping orifice or die opening into a zone of lower temperature and pressure in order to form the desired low density, closed-cell ethylenic polymer foam.

Blowing agents suitably employed in the practice of the present invention include halogenated hydrocarbon compounds (and mixtures thereof) having from 1 to 4 carbon atoms and having an atmospheric boiling point below the foaming temperature employed and preferably below about 30° C. As a practical matter, the particular blowing agent most suitably employed in a given instance will depend largely upon the identity and nature of the specific polymers employed in such instance. Thus, for example, as a general rule the hereinafter described "group I" $C_2$–$C_4$ fluorocarbons are typically most suitably employed in conjunction with the aforementioned soft flexible polymer blends (e.g., blends comprising soft, low modulus polymers such as ethylene/vinyl acetate copolymers). However, in the case of blends comprising other types of non-ionic ethylenic polymers (e.g., ethylene homopolymers such as low density polyethylene), the benefits attendant with practice of the instant invention are relatively more pronounced when other types of hydrocarbons or halogenated hydrocarbons (e.g., the hereinafter discussed group II volatile organic blowing agents, ethyl chloride, etc.) or mixtures thereof are employed.

Naturally, in the case of either of the aforementioned types of polymer blends, mixtures of two or more individual blowing agents of group I and of group II can be employed if so desired. However, it should be noted that it is a particular advantage of the present invention that a single group I blowing agent (e.g., 1,2-dichlorotetrafluoroethane) can be used to make the above-noted soft ethylenic copolymer blend foams.

In accordance with this invention, the term fluorocarbon is used herein to mean halocarbons containing carbonn and fluorine atoms, any other atoms being limited to hydrogen or chlorine atoms. The symbol "FC" hereinafter stands for "flourocarbon" and numbers are chosen for convenience in referring to these fluorocarbon compounds.

The group I fluorocarbons are required to have two to four carbon atoms in their molecular structure, normal boiling points, i.e., under standard one atmosphere pressure, between $-30°$ C. and $30°$ C. and a value for the critical quantity $T_b$-$0.5V_c$ of between 110 to 145 where $T_b$ is the normal boiling point temperature of the fluorocarbon in degrees Kelvin and $V_c$ is its critical mole volume in cubic centimeters per gram-mole. [The critical volume of a substance can be experimentally measured, and the values of many are reported in the literature. It can also be computed as the reciprocal of the critical density, converted to gram-mole basis. Approximate values of critical volume can also be calculated from the molecular structure according to the Lydersen equation as described in "Chemical Process Principles" by Olaf A. Hougen, K. M. Watson and R. A. Ragatz, 2nd Edition, published (1954) by John Wiley & Sons, New York, page 88 and Table 6, page 91. The Lydersen equation is $V_c = 40 + \Sigma \Delta v$ where $V_c$ is the critical volume in cubic centimeters per gram-mole and $\Sigma \Delta v$ is the summation of the contributions for each atom or atomic group that is present, using values set out in Table 6 on page 91 of the publication.] Specific examples of such group I fluorocarbons are 1,2-dichlorotetrafluoroethane (FC-114), 1-chloro-1,2,2,2-tetrafluoroethane (FC-124A), 1-chloro-1,1,2,2-tetrafluoroethane (FC-124) and 1,1,1-trifluoropropane (FC-263). Each of these fluorocarbons has a normal boiling point temperature between $-30°$ to $30°$ C. and a value for $T_b - 0.5V_c$ between 110–145. There can be up to about 0.35 gram-mole of such blowing agent per 100 grams of resin blend in the flowable gel. The resulting copolymer blend foams have densities from about 1 to about 6 pounds per cubic foot (pcf) and are preferably of a lower density such as in the range of from about 1 to about 3 pcf.

Volatile organic blowing agents of the group II consists of sub-group A of dichlorodifluoromethane (FC-12), sub-group B of fluorocarbons having one to four carbon atoms in their molecular structure, normal boiling point temperature between $-50°$ to $50°$ C. and a value for the critical quantity $T_b - 0.5V_c$ of between 146–190, and sub-group C of hydrocarbons having three to five carbon atoms in their molecular structure. Specific examples of such sub-group B fluorocarbons are trichlorofluoromethane (FC-11), 1-chloro-1,1-difluoroethane (FC-142B), 1,1-difluoroethane (FC-152A) and 2,2-difluoropropane (FC-272). Specific examples of sub-group C hydrocarbons are propane, isobutane and neopentane. These group II blowing agents can also be employed in an amount up to about 0.35 gram-mole thereof per 100 grams of the resin blend and the resulting polymer blend foams generally have densities in the range of from 1 to about 6 (preferably from about 1 to about 3) pounds per cubic foot.

As has been noted, the ethylenic polymer resin blend foams of the present invention can broadly have non-ionic polymer contents of from about 5 to about 95 weight percent based upon the total polymer weight. However, it is a particularly beneficial feature of this invention that the use of non-neutralized ethylene/carboxylic acid copolymers having relatively high carboxylic acid content (e.g., from about 15 to about 45 weight percent of carboxylic acid monomer units therein) permits attainment of suitable dimensional stability at relatively low levels (e.g., from about 5 to about 40, especially from about 15 to about 40, weight percent) of such high acid content ethylene/carboxylic acid copolymers and thereby also permits the preparation of especially soft ethylenic polymer foams. Accordingly, an especially preferred embodiment of the present invention resides in an especially soft ethylenic polymer blend foam comprising (a) from about 5 to about 40 (preferably from about 10 to about 40 and more preferably from about 15 to about 35) weight percent (based on the polymer blend) of a non-neutralized copolymer of ethylene with from about 15 to about 45 weight percent (based upon such copolymer) of an ethylenically unsaturated carboxylic acid monomer and (b) from about 60 to about 95 (preferably from about 60 to about 90, especially from about 65 to about 85) weight percent (based on the polymer blend) of the above-discussed low modulus non-ionic ethylenic copolymers.

In the practice of this invention, the blowing agent is compounded into the starting ethylenic polymer resin blend in proportions to make the desired degree of expansion in the resulting foamed cellular product, usually up to about 60-fold volume expansion to make products having aged foam densities down to about 0.016 g/cc (about 1.0 pound per cubic foot). Depending on the starting proportion of blowing agent, the resulting foam products of this invention have relatively low foam densities, for example, having a density of from about 1.0 to about 6 pounds per cubic foot (pcf), and preferably having a density of from about 1.0 to about 3 pcf. The maximum useful proportion of such blowing agent in composition of flowable, foamable gel is in the order of about 0.35 gram-mole per 100 grams of the starting resin. The maximum useful proportion of blowing agent in the foamable gel is also affected by the pressure which is maintained on the gel in the extrusion die passage, being greater when the die pressure is relatively higher under conditions such as when the die orifice is relatively smaller and/or the through-put rate is relatively greater.

The blowing agent is compounded into the starting resin blend in conventional fashion to make a flowable gel, preferably in continuous manner, e.g., in a mixing extruder, using heat to plastify the resin blend, pressure to maintain the blowing agent in non-gaseous state, and mechanical working to obtain a thorough mixing of the resin blend and blowing agent. The resulting gel is then cooled if necessary and passed through a suitable die orifice into a zone of lower pressure, e.g., normal ambient air temperature, where it expands to a lower density, cellular mass. As the foamed extrusion forms, it is taken away from the extruder, allowed to cool to harden the resin blend, and collected for further processing, storage and subsequent use.

The resulting ethylenic polymer blend foam is comprised of substantially closed-cell structure and has generally improved dimensional stability on exposure to ambient atmospheric air, even at low foam density.

For the present purposes, dimensional stability of the foam refers to changes which occur in foam volume, particularly in later stages of manufacture and during subsequent storage of the foam product.

As the foamable gel emerges from the extruder die orifice in the foam extrusion process, foaming begins, and the gel foam volume increases with expansion of the gas constituent forming many closed cells in the resin matrix. The evaporation of blowing agent from liquid gel phase to gas phase and exposure of the gel to ambient atmosphere causes cooling of the foam so that the expanding gel/resin foam quickly reaches a maximum volume and then begins to shrink. This first shrinkage stage is primarily caused by the effect of falling temperature on the foam cell volume but is complicated by the relatively greater diffusion of gases out of rather than into the cell space. The thermal shrinkage of the foam would stop when the foam resin hardens and the foam temperature reaches ambient atmosphere temperature, if no other factors were present. Usually, the foam continues to shrink at ambient temperature during the period when the net rate of diffusion of gases out of the foam cells is greater than the rate of diffusion of air into such cells. As indicated, in foams of low density and in soft foams of relatively low stiffness copolymer blends; this loss of gas from the foam cell is manifested by decreased volume of the cells and shrinkage of the foam, whereas in a foam of more rigid material the gas loss would result in lower cell gas pressure with little or no shrinkage of the foam volume overall.

In soft and/or low density foams, any shrinkage as described continues until the cell gas composition changes sufficiently to balance the gas diffusion out of and into the cells. Having reached a minimum, the foam volume then usually begins to expand again as air continues to diffuse into the cell space from which residual gas from the blowing agent is diffusing at ever lower rate. This re-expansion of the foam from minimum volume continues until the cells are again inflated and the foam attains substantially constant volume.

For the present purposes, the dimensional stability of the extrusion foam products is measured by observing the changes in volume occurring in test specimens of the foam as a function of time. The test specimens are obtained by quickly cutting, from the extrusion foam product soon, e.g., within about fifteen minutes, after emerging from the extrusion die orifice, pieces of a convenient size and accurately measuring their overall volume, e.g., by cubic displacement of water. The initial volume of each specimen is arbitrarily selected as the bench mark volume for the subsequent dimensional stability study. The individual foam specimen is exposed to air at atmospheric pressure and ordinary room temperature; its volume is re-measured from time-to-time and related on a volume percentage basis to the initial volume. From the resulting data observations are made particularly as to:

(1) the minimum (or maximum) volume to which the specimen is reduced (or increased) by shrinking (or expanding) as percent of initial volume;
(2) the time required to reach such minimum volume of (1);
(3) the steady state volume to which the specimen subsequently re-expands or recovers, as percent of initial volume; and
(4) the time required to reach such steady state recovered volume of (3).

In general, the preferred products have little (preferably less than about 15 volume percent and most preferably less than about 10 volume percent) shrinkage or expansion in (1) and/or recover their initial volume (3) in a short time (4). In practical terms, substantially complete recovery (3) and attainment of constant volume in relatively short time (4) are probably more important than the degree of shrinking in (1), although systems that show little early shrinkage often also show prompt and complete recovery to constant volume.

In the instant invention, an extruded foam product is considered to be dimensionally stable for practical purposes if the volume of the foam, following the initial shrinking thereof, recovers to a substantially constant volume of about 90, preferably 95, percent of the foam volume measured shortly, e.g., within about 15 minutes, after extrusion from the die orifice, within about 4, preferably about 2, weeks after its extrusion. The term "dimensionally stable" in reference to the subject ethylenic polymer foams is used herein in the sense of the foregoing definitive description. Especially preferred foams of the present invention are those which do not shrink or expand by more than about 15 percent of their initially formed volume during prolonged exposure to air at ambient temperature (e.g., about 25° C.) following the preparation thereof.

The specific working examples that follow are intended to illustrate the invention but are not to be taken as limiting its scope. In the examples, parts and percentages are by weight unless otherwise specified or required by the context.

EXAMPLE I

Ethylenic polymer blend foams are made by continuous extrusion from a conventional screw-type extruder having additional zones for mixing and cooling following the usual sequential zones for feeding, melting and metering. The barrel is provided with conventional electric heaters for zoned temperature control and with usual instrumentation. An inlet opening for fluid blowing agent under pressure and feed rate control is provided in the extruder barrel between the metering zone and the mixing zone. The discharge end of the mixing zone of the extruder is connected, through the cooling zone to a die orifice having generally rectangular configuration.

In practice, polymeric resins in the form of common granules are fed through a feed hopper to the extruder. The temperature in the metering zone is maintained in the range 180±20° C. Blowing agent is pumped into the inlet between the metering and mixing zones at a predetermined rate under pressure to maintain liquid phase. The mixed mass of molten polymer blend and blowing agent from the mixing zone is cooled in the cooling zone to a substantially uniform temperature which is just above the temperature at which solid polymer would crystallize out of the gel, which in the case of the ethylenic copolymer blends used in this example is about 96° C. and in the case of the ethylene/vinyl acetate copolymer employed is about 85° C., before passing through the die orifice. The mass emerging from the die orifice to atmospheric pressure expands and forms a cellular foam which is continuously conducted away from the die as the foam forms, cools and hardens to a strip of foamed, cellular, flexible solid resin blend.

In the tests described below in this Example, there are used polymer blends of an ethylene/vinyl acetate copolymer (18 weight percent vinyl acetate, melt index=2.5) and ethylene/acrylic acid copolymer (8 weight percent acrylic acid, melt index=5.5) in the proportions indicated in Table I below. A small amount (approximately 0.25 to 0.75 parts by weight per 100 parts polymer) of talc is fed into the extruder with the polymer for cell size control. Excellent quality closed-cell foams having a uniform cell size in the range of 0.9 to 1.6 mm are obtained throughout the tests. Specimens ae cut from the resulting extruded foam products about 5 minutes after extrusion. These specimens are cut to about 7.5 inches long in the direction of extrusion and about 5.5 inches in the width direction. The volumes of these specimens are measured as a function of time by cubic displacement of water.

As can be seen from the results in Table I, the foams generally shrink initially and then recovers. The minimum in foam volume normally occurs within a week. A foam that shrinks more is considered less desirable since it generally takes longer for such a foam to recover to its original volume. Thus, the minimum volume as a percentage of initial volume is a reliable indicator of foam stability.

As the results for Test I.1 in Table I indicates, the ethylene/vinyl acetate copolymer foam shrinks to about 55 percent of the initial volume and recovers very slowly. In contrast, foams produced from blends of such ethylene/vinyl acetate copolymer with 40 weight percent or more of the ethylene/acrylic acid copolymer show notably improved dimensional stability (see Tests I.4 through I.10). In addition, the results for Tests I.2 and I.3 illustrate the desirability, in the absence of an auxiliary stability control agent, of employing 40 weight percent or more of the carboxylic acid-containing copolymer when such copolymer contains a relatively small amount of carboxylic acid monomer copolymerized therein.

extruder has essentially the same configuration as the one employed in Examples I and II. The die opening is 0.25 inch in width and its gap is adjustable. The operating procedure of this extruder is essentially the same as the one in Examples I and II.

An ethylene/vinyl acetate copolymer (18 percent by weight vinyl acetate and 0.7 melt index) is dry blended with an ethylene/acrylic acid resin (8 percent acrylic acid by weight and 5.5 melt index) at a specified ratio. A small amount (approximately 0.7 pph) of talc powder is also mixed in with the resin by use of a wetting agent. The mixture is fed to the extruder at a uniform rate and the extruder zone temperatures are maintained at about 140° C. at the feeding zone, 180° C. at the melting and metering zones and 150° C. at the mixing zone. FC-114 is injected into the injection port under pressure at a predetermined rate. The temperature of the cooling zone is adjusted so that the temperature of the gel is brought down to about 91° C. The die opening is adjusted to make a smooth foam skin.

Excellent quality foams having uniform fine cell size are obtained from the various polymer compositions as specified in Table III. Foams have approximately rectangular cross-sections of about 1.5 inch width and various thicknesses as set forth in Table III. Foam dimensional stability was determined with specimens cut to about 6 inches long.

As is apparent from the results in Table III, even a small amount of the ethylene/acrylic acid copolymer (10 pph) substantially decreases the maximum foam shrinkage.

TABLE I

| Test No. | EAA Level (1) | BA Level (2) | Foam Density (3) | Foam Dimension (4) | Minimum Volume (5) | Volume Percent After Time in Weeks (6) | | | | |
|---|---|---|---|---|---|---|---|---|---|---|
| | | | | | | 1 | 2 | 3 | 4 | 5 |
| I.1* | 0 | 21 | 2.83 | 1.48 | 55 | 56 | 58 | 59 | 67 | 70 |
| I.2 | 20 | 32 | | | Foam Collapsed | | | | | |
| I.3 | 30 | 29 | | | Foam Collapsed | | | | | |
| I.4 | 40 | 29.5 | 2.04 | 1.80 | 81 | 88 | 88 | 94 | 93 | 94 |
| I.5 | 50 | 31 | 2.00 | 1.72 | 78 | 82 | 80 | 86 | 86 | 89 |
| I.6 | 60 | 31 | 1.80 | 1.95 | 87 | 90 | 90 | 92 | 90 | 91 |
| I.7 | 60 | 48 | 1.50 | 1.96 | 87 | 90 | 94 | 93 | 94 | 92 |
| I.8 | 70 | 31.5 | 1.77 | 1.84 | 88 | 93 | 96 | 96 | 97 | 96 |
| I.9 | 80 | 31.5 | 1.79 | 1.85 | 92 | 95 | 99 | 99 | 99 | 99 |
| I.10 | 90 | 31.5 | 1.74 | 1.85 | 91 | 96 | 99 | 99 | 99 | 98 |

Notes:
*Not an example of this invention.
(1) Weight percent of ethylene/acrylic acid copolymer in the blend.
(2) Parts of FC-114 blowing agent mixed in per hundred parts of polymer.
(3) Density of foam body in pounds per cubic foot measured within about 5 minutes after extrusion.
(4) Thinnest dimension of foam body in inches.
(5) Minimum volume of foam body during ambient temperature aging as a percentage of initial volume.
(6) Volume of foam body after specified time at ambient temperature as a percentage of initial volume.

EXAMPLE II

Example I is repeated except a different ethylene/vinyl acetate (EVA) copolymer (28 weight percent vinyl acetate and melt index=6) is employed in place of the EVA copolymer employed in Example I. The results of this series of tests are summarized in Table II below.

TABLE II

| Test No. | EAA Level (1) | BA Level (2) | Foam Density (3) | Foam Dimension (4) | Minimum Volume (5) | Volume Percent After Time in Weeks (6) | | | | |
|---|---|---|---|---|---|---|---|---|---|---|
| | | | | | | 1 | 2 | 3 | 4 | 5 |
| II.1 | 60 | 31.5 | 1.87 | 1.97 | 96 | 97 | 95 | 96 | 96 | 96 |
| II.2 | 70 | 31.5 | 1.85 | 1.81 | 99 | 101 | 98 | 99 | 99 | 99 |

Notes:
(1) through (6) the same as in Table I.

EXAMPLE III

The apparatus used in this example is a conventional screw type extruder having 1¼ inch screw diameter. The

TABLE III

| Test No. | EAA Level (1) | BA Level (2) | Foam Density (3) | Foam Dimension (4) | Minimum Volume (5) | Volume Percent After Time in Weeks (6) | | | | |
|---|---|---|---|---|---|---|---|---|---|---|
| | | | | | | 1 | 2 | 3 | 4 | 5 |
| III.1* | 0 | 42 | 1.60 | 1.30 | 44 | 50 | 55 | 59 | 61 | 64 |
| III.2 | 10 | 42 | 1.57 | 1.33 | 62 | 64 | 67 | 71 | 72 | 76 |

TABLE III-continued

| Test No. | EAA Level (1) | BA Level (2) | Foam Density (3) | Foam Dimension (4) | Minimum Volume (5) | Volume Percent After Time in Weeks (6) | | | | |
|---|---|---|---|---|---|---|---|---|---|---|
| | | | | | | 1 | 2 | 3 | 4 | 5 |
| III.3 | 20 | 43 | 1.63 | 1.28 | 66 | 67 | 72 | 74 | 74 | 76 |
| III.4 | 30 | 45 | 1.50 | 1.14 | 68 | 70 | 74 | 79 | 80 | 84 |
| III.5 | 40 | 44 | 1.50 | 1.19 | 90 | 92 | 92 | 93 | 94 | 95 |
| III.6 | 50 | 46 | 1.50 | 1.41 | 93 | 97 | 95 | 96 | 95 | 96 |
| III.7 | 60 | 46 | 1.46 | 1.48 | 92 | 97 | 95 | 95 | 95 | 96 |
| III.8 | 70 | 45 | 1.46 | 1.43 | 94 | 99 | 97 | 96 | 97 | 97 |
| III.9 | 80 | 43 | 1.51 | 1.44 | 95 | 99 | 98 | 97 | 97 | 97 |
| III.10 | 90 | 39 | 1.54 | 1.46 | 94 | 98 | 97 | 96 | 97 | 96 |

Notes:
*Not an example of this invention.
(1) through (6) the same as in Table I.

EXAMPLE IV

In this example, the same polymers, blowing agent and extruder as used in Example III are employed. In addition, stearamide is added to the polymer blends as a stability control agent in an amount of about 0.5 parts by weight per 100 parts polymer pursuant to the teachings of U.S. application Ser. No. 952,865 (filed Oct. 19, 1978) by S. Watanabe and Y. Matsuki. As the data in Table IV shows, while the stearamide does improve the dimensional stability of the ethylene/vinyl acetate copolymer foam, a further stability improvement is achieved by the use of the ethylene/acrylic acid copolymer in conjunction with such stearamide stability control agent.

TABLE IV

| Test No. | EAA Level (1) | BA Level (2) | Foam Density (3) | Foam Dimension (4) | Minimum Volume (5) | Volume Percent After Time in Weeks (6) | | | | |
|---|---|---|---|---|---|---|---|---|---|---|
| | | | | | | 1 | 2 | 3 | 4 | 5 |
| IV.1* | 0 | 45 | 1.46 | 1.31 | 71 | 71 | 73 | 75 | 76 | 77 |
| IV.2 | 10 | 43 | 1.52 | 1.37 | 82 | 83 | 82 | 84 | 84 | 86 |
| IV.3 | 20 | 40 | 1.58 | 1.06 | 80 | 86 | 86 | 87 | 86 | 88 |
| IV.4 | 30 | 45 | 1.53 | 1.34 | 94 | 95 | 95 | 95 | 95 | 96 |
| IV.5 | 40 | 45 | 1.48 | 1.03 | 92 | 94 | 94 | 95 | 95 | 96 |

Notes:
*Not an example of this invention.
(1) through (6) the same as in Table I.

EXAMPLE V

Example III is repeated except that the ethylene/vinyl acetate copolymer there employed is replaced by an ethylene/vinyl acetate copolymer derived from 15 weight percent vinyl acetate and having a melt index of 2.5. The foaming temperature (i.e., the cooling zone temperature) employed is about 93° C.

Excellent quality foams having closed-cell structure and low foam density are achieved throughout the test in this example. Again, addition of ethylene/acrylic acid copolymer to the ethylene/vinyl acetate copolymer is observed to result in substantial improvement of foam dimensional stability as is shown in Table V below.

TABLE V

| Test No. | EAA Level (1) | BA Level (2) | Foam Density (3) | Foam Dimension (4) | Minimum Volume (5) | Volume Percent After Time in Weeks (6) | | | | |
|---|---|---|---|---|---|---|---|---|---|---|
| | | | | | | 1 | 2 | 3 | 4 | 5 |
| V.1* | 0 | 42 | 1.77 | 1.22 | 47 | 54 | 60 | 64 | 68 | 71 |
| V.2 | 20 | 42 | 1.57 | 1.45 | 64 | 67 | 71 | 73 | 77 | 80 |
| V.3 | 50 | 42 | 1.57 | 1.42 | 90 | 91 | 93 | 93 | 93 | 94 |
| V.4 | 80 | 41 | 1.71 | 1.53 | 95 | 97 | 97 | 97 | 97 | 97 |

Notes:
*Not an example of this invention.
(1) through (6) the same as in Table I.

EXAMPLE VI

Example III is again repeated employing an ethylene/vinyl acetate copolymer (15 weight percent vinyl acetate and melt index=2.5) and ethylene/acrylic acid (EAA) copolymer having an acrylic acid content of 22.9 weight percent and a melt index of 47 in the proportions shown in Table VI below. The foaming temperature (i.e., cooling zone temperature) is in the range of from 87° to 92° C. The test results for this example are summarized in Table VI below.

As can be seen from the results in Table VI, the 22.9 weight percent acrylic acid-containing EAA copolymer is very effective at preventing foam shrinkage at relatively low levels (e.g., 20 weight percent) thereof in the subject polymer blends. In addition, such results also illustrate the desirability—when using carboxylic acid copolymers having relatively high carboxylic acid unit contents (e.g., above 15 weight percent) therein—of employing relatively smaller amounts thereof (e.g., less than 40 weight percent) in the polymer blend in order to avoid undesirably large expansion of the resulting polymer foams.

TABLE VI

| Test No. | EAA Level (1) | BA Level (2) | Foam Density (3) | Foam Dimension (4) | Minimum Volume (5) | Volume Percent After Time in Weeks (6) | | | | |
|---|---|---|---|---|---|---|---|---|---|---|
| | | | | | | 1 | 2 | 3 | 4 | 5 |
| VI.1 | 20 | 42 | 1.77 | 0.93 | 103 | 104 | 104 | 104 | 104 | 105 |
| VI.2 | 80 | 41 | 1.74 | 1.32 | 93 | 151 | 171 | 185 | 190 | 193 |

Notes:
(1) through (6) the same as in Table V.

EXAMPLE VII

Example III is repeated using (1) an ethylene/vinyl acetate copolymer having a vinyl acetate content of 18 weight percent and a melt index of 2.5 and (2) an ethylene/acrylic acid (EAA) copolymer having an acrylic acid (AA) content of 18.3 weight percent and a melt index of 19.5. The proportions of the two polymers in the blends employed in the individual tests are set forth in Table VII below along with the dimensional stability results for such individual tests.

As can be seen from such results, the use of as little as 10 weight percent of the EAA copolymer (having 18.3 weight percent of AA therein) provides notable dimensional stability improvement to the resulting polymer foam and the use of 20 weight percent of such EAA polymer prevents the resulting foam from shrinking to a value of less than 90 percent of its initial volume following its manufacture.

TABLE VII

| Test No. | EAA Level (1) | BA Level (2) | Foam Density (3) | Foam Dimension (4) | Minimum Volume (5) | Volume Percent After Time in Weeks (6) | | | | |
|---|---|---|---|---|---|---|---|---|---|---|
| | | | | | | 1 | 2 | 3 | 4 | 5 |
| VII.1* | 0 | 39 | 1.59 | 1.05 | 51 | 53 | 57 | 59 | 61 | 65 |
| VII.2 | 10 | 32 | 1.73 | 1.43 | 62 | 65 | 68 | 69 | 72 | 74 |
| VII.3 | 15 | 35 | 1.63 | 1.42 | 82 | 83 | 85 | 85 | 89 | 88 |
| VII.4 | 20 | 33 | 1.72 | 1.50 | 91 | 92 | 92 | 93 | 94 | 92 |

Notes:
*Not an example of this invention.
(1) through (6) the same as in Table I.

EXAMPLE VIII

Example VII is repeated except that 1-chloro-1,1-difluoroethane (FC-142b) is employed as the blowing agent in place of 1,2-dichlorotetrafluoroethane (FC-114). The results are summarized in Table VIII below.

As can be seen from the results in Table VIII, the foam made from the ethylene/vinyl acetate (EVA) copolymer alone shrinks to a minimum volume which is only 24 percent of its initial volume whereas the foam made using a 50:50 weight ratio blend of that EVA with the ethylene/acrylic acid copolymer shrinks only to 89 percent of its original volume, recovers to over 90 percent within one week of aging time and is therefore considered to have good dimensional stability.

TABLE VIII

| Test No. | EAA Level (1) | BA Level (2) | Foam Density (3) | Foam Dimension (4) | Minimum Volume (5) | Volume Percent After Time in Weeks (6) | | | | |
|---|---|---|---|---|---|---|---|---|---|---|
| | | | | | | 1 | 2 | 3 | 4 | 5 |
| VIII.1* | 0 | 23.9 | 1.62 | 1.00 | 24 | 28 | 32 | 34 | 37 | 39 |
| VIII.2 | 50 | 24.2 | 1.40 | 1.08 | 89 | 91 | 92 | 92 | 94 | 95 |

Notes:
*Not an example of this invention.
(1) and (3) through (6) the same as in Table I.
(2) Parts of FC-142b blowing agent mixed in per hundred parts of polymer.

EXAMPLE IX

Example III is repeated using the different blowing agent systems identified in Table IX below and using a low density polyethylene (melt index=2.3) and blends thereof with 40 weight percent of an ethylene/acrylic acid (EAA) copolymer having an acrylic acid content of 22.9 weight percent and a melt index of 47. The foaming temperature employed in tests of this example is about 105° C.

The results of such tests are summarized in Table IX below. From such results, it is seen that the foams prepared from the low density polyethylene alone have very poor dimensional stability whereas those foams made from blends of such polyethylene with 40 weight percent of the EAA copolymer exhibit good dimensional stability.

TABLE IX

| Test No. | EAA Level (1) | Type (8) | Blowing Agent Ratio (7) | Level (2) | Foam Density (3) | Foam Dimension (4) | Minimum Volume (5) | Volume Percent After Time in Weeks (6) | | | | |
|---|---|---|---|---|---|---|---|---|---|---|---|---|
| | | | | | | | | 1 | 2 | 3 | 4 | 5 |
| *IX.1 | 0 | FC-12 | — | 17.4 | 2.25 | 1.26 | 62 | 62 | 69 | 76 | 80 | 83 |
| IX.2 | 40 | FC-12 | — | 18.5 | 2.30 | 1.21 | 85 | 88 | 90 | 93 | 93 | 94 |
| *IX.3 | 0 | FC-12/FC-11 | 80/20 | 16.1 | 2.40 | 1.40 | 64 | 64 | 71 | 77 | 82 | 84 |
| IX.4 | 40 | FC-12/FC-11 | 80/20 | 18.2 | 1.95 | 1.08 | 95 | 104 | 104 | 105 | 105 | 105 |
| *IX.5 | 0 | FC-12/FC-11 | 60/40 | 16.4 | 2.77 | 1.47 | 53 | 53 | 58 | 63 | 66 | 69 |
| IX.6 | 40 | FC-12/FC-11 | 60/40 | 18.7 | 2.09 | 1.03 | 92 | 98 | 101 | 103 | 104 | 105 |

TABLE IX-continued

| Test No. | EAA Level (1) | Type (8) | Blowing Agent Ratio (7) | Level (2) | Foam Density (3) | Foam Dimension (4) | Minimum Volume (5) | Volume Percent After Time in Weeks (6) | | | | |
|---|---|---|---|---|---|---|---|---|---|---|---|---|
| | | | | | | | | 1 | 2 | 3 | 4 | 5 |
| *IX.7 | 0 | FC-12/EtCl | 80/20 | 13.2 | 2.40 | 1.34 | 47 | 51 | 59 | 67 | 70 | 74 |
| IX.8 | 40 | FC-12/EtCl | 80/20 | 15.1 | 1.98 | 1.15 | 95 | 106 | 108 | 110 | 109 | 110 |
| *IX.9 | 0 | FC-12/EtCl | 60/40 | 13.0 | 2.45 | 1.52 | 41 | 45 | 51 | 56 | 61 | 65 |
| IX.10 | 40 | FC-12/EtCl | 60/40 | 15.1 | 1.84 | 1.15 | 83 | 93 | 100 | 105 | 105 | 106 |

Notes:
*Not an example of this invention.
(1) through (6) = the same as in Table I.
(7) = Weight percent of each blowing agent in the mixture.
(8) = FC-12 = dichlorodifluoromethane; FC-11 = trichlorofluoromethane; EtCl = ethyl chloride.

While the present invention has been herein described with reference to certain specific illustrative examples and embodiments thereof, such specific examples and embodiments are not to be understood as in any way limiting the scope of the instantly claimed invention.

What is claimed is:

1. A low density, substantially closed-cell ethylenic polymer foam comprising, based upon the total weight of such polymer foam, from about 5 to about 95 weight percent of a non-ionic ethylenic polymer and from about 5 to about 95 weight percent of non-neutralized carboxylated copolymer comprising, in addition polymerized form, a predominant amount of ethylene and from about 3 to about 45 weight percent, based upon the weight of such non-neutralized carboxylated copolymer, of a monoethylenically unsaturated carboxylic acid.

2. The polymer foam of claim 1 wherein the carboxylated copolymer comprises from 5 to about 35 weight percent of the monoethylenically unsaturated carboxylic acid based upon the weight of such carboxylated copolymer.

3. The polymer foam of claim 1 wherein the carboxylated copolymer constitutes from about 5 to about 40 weight percent of such polymer foam.

4. The polymer foam of claim 3, wherein the carboxylated copolymer contains, based upon the weight of such copolymer, from about 15 to about 45 weight percent of the monoethylenically unsaturated carboxylic acid.

5. The polymer foam of claim 3, wherein the carboxylated copolymer contains, based upon the weight of such copolymer, from about 3 to about 15 weight percent of the monoethylenically unsaturated carboxylic acid.

6. The polymer foam of claim 5 which further comprises, based upon polymer weight, from about 0.1 to about 10 weight percent of an auxiliary stability control agent.

7. The polymer foam of claim 6, wherein the auxiliary stability control agent is employed in an amount of from about 0.2 to about 2 weight percent based upon the polymer weight.

8. The polymer foam of claim 7, wherein the auxiliary stability control agent is stearamide.

9. The polymer foam of claim 1, wherein the non-ionic polymer thereof is polyethylene.

10. The polymer foam of claim 1, wherein the non-ionic polymer is a copolymer of ethylene with from 5 to about 45 weight percent, based upon the weight of such non-ionic polymer, of a non-ionic comonomer.

11. The polymer foam of claim 10, wherein the non-ionic comonomer is vinyl acetate.

12. The polymer foam of claim 10, wherein the non-ionic comonomer is ethyl acrylate.

13. The polymer foam of claim 10, wherein the non-ionic comonomer constitutes from about 10 to about 45 weight percent of the non-ionic copolymer.

14. The polymer foam of claim 10, wherein the non-ionic comonomer constitutes from about 15 to about 30 weight percent of the non-ionic copolymer.

15. The polymer foam of claim 1, wherein the monoethylenically unsaturated carboxylic acid is acrylic acid.

* * * * *